No. 762,788. Patented June 14, 1904.

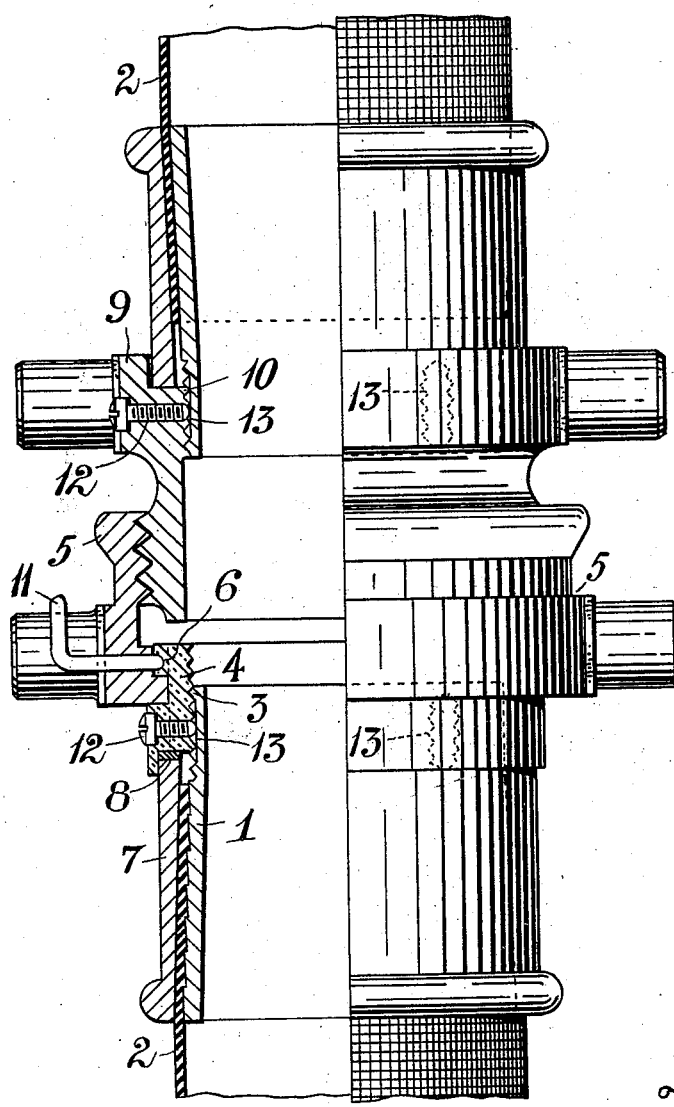

UNITED STATES PATENT OFFICE.

GEORGE WESLEY WHITE, OF FOOTSCRAY, VICTORIA, AUSTRALIA, ASSIGNOR TO JAMES WAGGLEN, OF BURWOOD ROAD, HAWTHORN, VICTORIA, AUSTRALIA.

HOSE-COUPLING.

SPECIFICATION forming part of Letters Patent No. 762,788, dated June 14, 1904.

Application filed August 24, 1903. Serial No. 170,596. (No model.)

*To all whom it may concern:*

Be it known that I, GEORGE WESLEY WHITE, fireman, a subject of the King of Great Britain, residing at the Fire Station, Droop street, Footscray, in the State of Victoria, Australia, have invented an Improved Hose-Coupling, of which the following is a specification.

This invention relates to means for attaching hose to metal fittings or connecting two lengths of hose; and it consists in a hose-coupling which can readily be applied, protects the hose end, is thoroughly reliable, and may, if required, be easily released.

In the accompanying drawing, which is a half elevation and half vertical section of my improved hose-coupling as used for connecting two lengths of hose, it will be seen that at one end is a coned sleeve or thimble 1, ridged or plain, adapted to be placed inside the hose end 2 and having its outer extremity 3 threaded to engage a correspondingly-threaded nut 4, fitting within the usual brass union 5 and adapted to be turned therewith when a pin or key 11 is temporarily inserted in the hole or keyway 6. Before said union and nut are applied a collar 7, coned internally to correspond with the above-mentioned coned sleeve 1, is slipped over the hose end 2, which is therefore jammed between the two, as shown, the degree of tightness being adjusted by screwing up the union 5 and with it the nut 4, having a washer 8, which abuts against the end of the outer coned collar 7. This moves the sleeve 1 and said collar 7 in opposite directions, which forces them tightly together, thereby firmly gripping the hose between them and effecting a reliable coupling in a simple and expeditious manner, while the outer coned collar also protects the hose end from cutting, which is a serious defect in the ordinary form of coupling.

The female union 5 is threaded internally in the usual manner to engage the hydrant or tap or, if for connecting two hoses together, as shown in drawing, to receive the male union 9, which is also internally threaded, as at 10, so that it may be screwed to the coned sleeve or thimble 1 of the next hose end, which is secured in a similar manner, except that the nut 4, which acts as a swivel, is unnecessary.

With large hose, such as used by firemen, means are provided for preventing the possibility of the unions unscrewing, and this is achieved when the coupling is completed by passing a screw 12 through the union or the nut into one of a series of slits 13 in the threads of the coned sleeve or thimble Having now particularly described and ascertained the nature of my said invention and in what manner the same is to be performed, I declare that what I claim is—

1. A hose-coupling comprising an externally-threaded coned thimble adapted to be inserted in the end of a hose-section and to extend therefrom, an internally-coned collar adapted to surround the end of the hose-section, a female union provided with a keyway extending therethrough, a nut mounted on the union and adapted to engage the screw-threads of said thimble, and a key extending through said keyway and engaging in said nut, substantially as herein shown and described.

2. A hose-coupling comprising an externally-threaded coned thimble adapted to be inserted in the end of a hose-section and to extend therefrom, said threads provided with slits, an internally-coned collar adapted to surround the end of the hose-section, a female union provided with a keyway extending therethrough, a nut mounted on the union and adapted to engage the screw-threads of said thimble, a key extending through said keyway and engaging in said nut, and a locking-screw extending through the nut and engaging in one of the slits, substantially as herein shown and described.

3. A hose-coupling comprising an externally-threaded coned thimble adapted to be inserted in the end of a hose-section and projected therefrom, said threads provided with slits, an internally-coned collar adapted to surround the end of the hose-section, a male union provided with internal threads adapted to engage the threads of the thimble, and a locking-screw extending through said union and engaging in one of said slits, substantially as herein shown and described.

4. A hose-coupling comprising a pair of cone-shaped members adapted to clamp a hose-section between them, one of said members provided with screw-threads, a female union, a nut engaging with said screw-threaded member and with said union for connecting it thereto, and means for locking the union to the nut, said nut when operated adapted to move said members in opposite directions.

5. A hose-coupling comprising a pair of cone-shaped members adapted to clamp a hose-section between them, one of said members provided with screw-threads, a female union, a nut engaging with said screw-threaded member and with said union for connecting it thereto, means for locking the union to the nut, said nut when operated adapted to move said members in opposite directions, and means for locking the nut to said screw-threaded member.

In testimony whereof I have signed my name to this specification in the presence of two subscribing witnesses.

GEORGE WESLEY WHITE.

Witnesses:
EDWARD WATERS,
WILLIAM HERBERT WATERS.